Patented Dec. 17, 1940

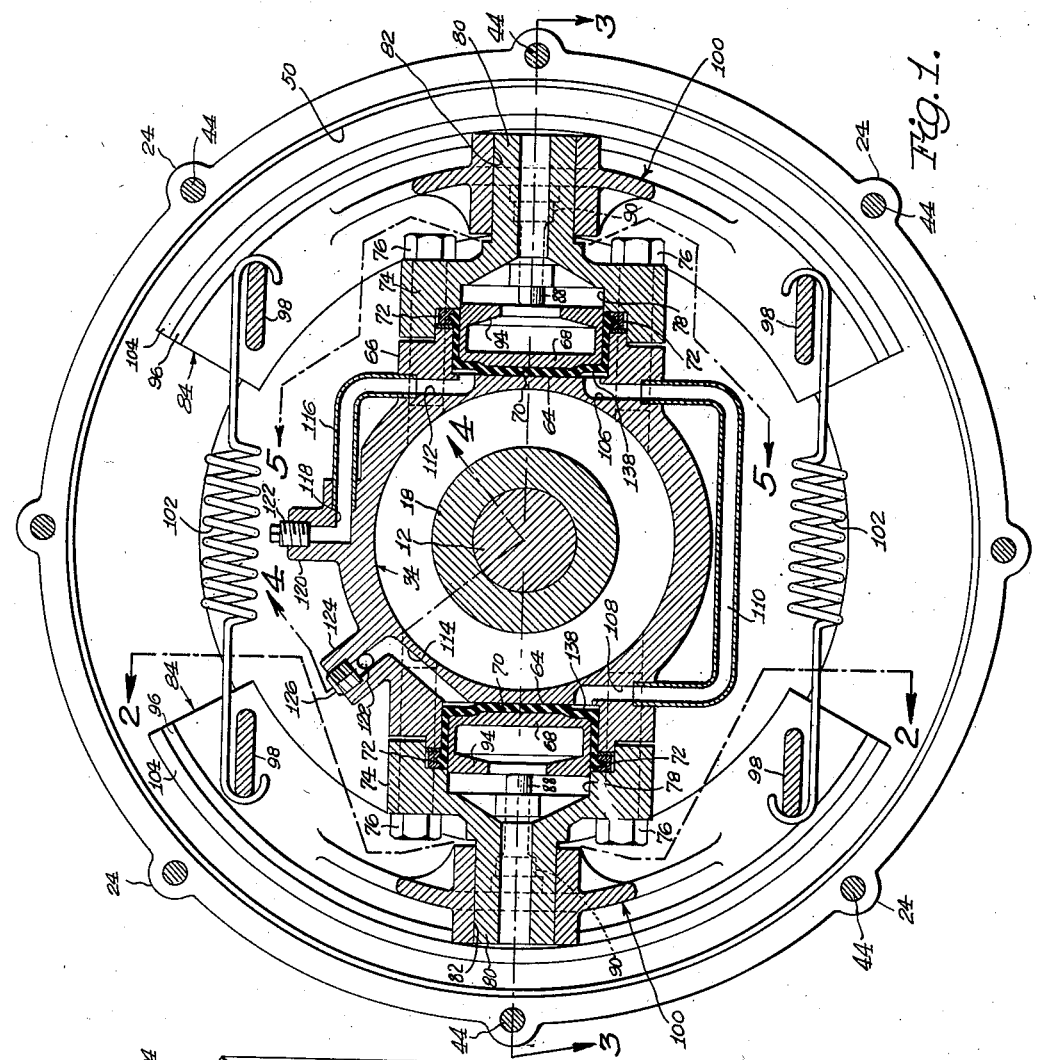

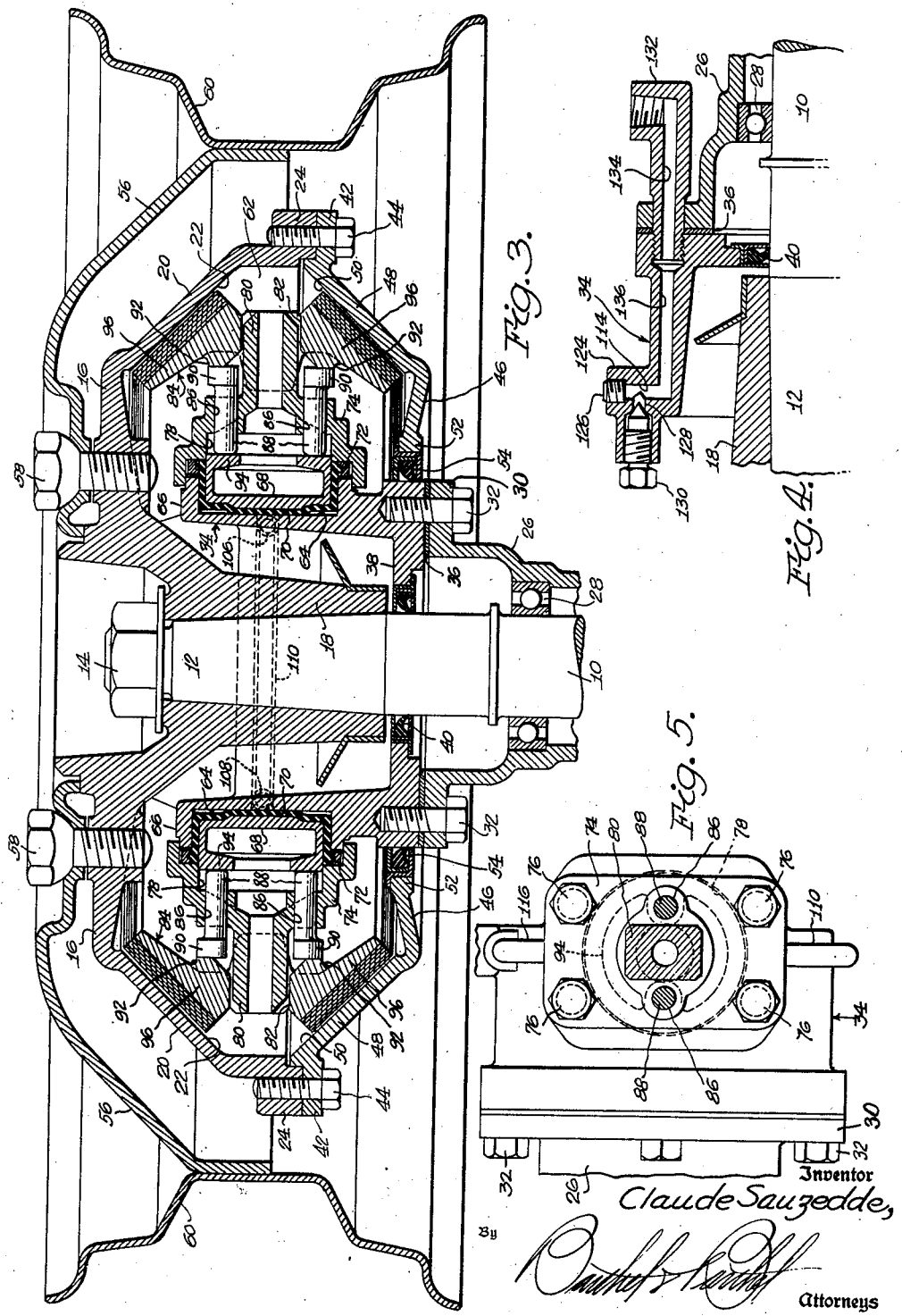

2,224,932

UNITED STATES PATENT OFFICE 2,224,932

BRAKE MECHANISM

Claude Sauzedde, Detroit, Mich., assignor to Detroit Hydrostatic Brake Corporation, Detroit, Mich., a corporation of Michigan Application June 27, 1939, Serial No. 281,448

11 Claims. (Cl. 188—152)

This invention relates, in general, to hydraulic brakes and, in particular, to improvements of the means for actuating same.

One of the objects of this invention is to improve a hydraulic brake whereby the life of the brake linings thereof is materially increased while at the same time and during said life a substantially constant pedal movement is maintained.

Another object is to provide a hydraulic brake with adjustments which permit effective braking over the entire life of the linings with a substantially constant pedal throw and without an additional charge of braking fluid, said adjustments being inexpensive, readily assembled, adapted for obtaining from said linings the full wearing ability thereof, and driven by the fluid pressure for positively driving the brake shoes on which said linings are mounted.

Another object of the invention is to improve the self-aligning ability of the brake shoe and lining with respect to the drum or braking surface.

An equally important object is to improve the fluid pressure transmission system of a hydraulic brake which will enable the weight of the brake shoe and actuator supporting unit to be materially reduced and at the same time to minimize the machining operations otherwise necessary to be performed on said unit for providing the fluid communicating passageways between the brakes on each wheel of the vehicle.

Other objects and advantages will become readily apparent from a reference to the following specification taken in conjunction with the accompanying drawings of which there are two (2) sheets and in which:

Figure 1 is a vertical section of a wheel brake in a plane transverse to the wheel axis and brake mechanism and showing in detail the invention incorporated therein;

Fig. 2 is an elevation, partly in section, of the brake shoe unit shown in Fig. 1 and taken along the lines 2—2 therein;

Fig. 3 is a section taken along the wheel axis at right angles to Fig. 1 and particularly along the lines 3—3 therein;

Fig. 4 is a detailed sectional view taken along the lines 4—4 in Fig. 1, and

Fig. 5 is an elevation, partly in section, of the actuator supporting spider and taken along the lines 5—5 in Fig. 1.

Referring particularly to Fig. 3, a live axle 10, contained within and extending from a live axle housing (not shown), is tapered at its outer end, as at 12. Secured to said tapered end 12 for rotation with axle 10, by a nut 14, is a radially extending disc 16, said disc having a hub portion 18 and an inclined portion 20 which extends annularly and provides at its inner surface a braking surface 22. The periphery of disc 16 is formed with a plurality of spaced lugs 24 each of which has a bore extending therethrough.

An annular flange 26, which may be secured to or be an integral and stationary part of the vehicle, such as the steering knuckle of a front axle assembly or the axle housing of a rear axle assembly, is herein illustrated as being adapted for being secured to the end of the aforementioned live axle housing in which is contained the live axle 10. The flange 26 is arranged coaxially with respect to axle 10 and therebetween is disposed an anti-friction bearing assembly 28. A radially extending annular portion 30 of flange 26 is provided with a plurality of spaced openings through which bolts 32 extend and to which bolts a spider, generally indicated at 34, is secured, there being a gasket 36 disposed between spider 34 and portion 30 of flange 26. The supported end of spider 34 is formed with an annular, inwardly directed flange 38 to which is secured an annular oil seal 40 which bears against the axle 10 and seals same thereat against the passage of oil and grease therepast.

To the lugs 24 of disc 16 are secured lugs 42, by bolts 44, of a radially extending disc 46, said disc 46 having a portion 48 inclined oppositely to portion 20 of disc 16 and providing at its inner surface a braking surface 50. The unsupported inner rim 52 of disc 46 is provided with an annular seal 54 which bears against the stationary spider 34 and seals same against the entrance of dirt and other foreign matter thereat. A rigid disc 56, secured to the disc 16 adjacent the hub portion 18 by a plurality of bolts 58, has welded or otherwise secured thereto at its periphery a tire carrying rim 60.

It will be seen, so far, that disc 56, which is usually ornamented in some manner or other, is spaced from the disc 16 except at the periphral contact therebetween, thereby reducing the effect of brake heat and elongating the life of such ornamentation; that disc 56 and rim 60 are removable as a unit from the wheel structure, thereby permitting tire changing and repairing without the necessity of disturbing the brake structure; that the structure as a whole is representative of a type of semi-floating wheel structure; and, that both discs 16 and 46 are readily separable without disturbing either the brake shoes or the spider which supports them. It will also be seen that the inclined portions 20 and 48 of discs 16 and 46, respectively, form an annular chamber 62 (see Fig. 3) which is frusto-conical in cross section and into which chamber the spider 34 extends for supporting therein with sealed relation to the outside thereof the brake shoes and actuating mechanism therefor.

As will be noted in Figs. 1 and 3, the spider 34 is formed as an annular body, solely supported by the bolts 32 and extending into the braking chamber 62, said extended portion of said spider being annularly spaced from the hub portion 18 of the disc 16 and formed with a pair of diametrically opposite fluid pressure chambers 64, each of which chambers faces the braking surfaces 22 and 50. Each of the chambers 64 is formed within a radially outwardly extending cylindrical wall portion 66 integrally formed on the inwardly extending portion of the spider 34, there being in each of said chambers 64 a reciprocally mounted piston 68. Between each piston 68 and the wall of its respective pressure chamber 64 is an expansible cup-shaped seal 70 which prevents the escape of fluid and pressure from one side of the piston to the other, said seal in each case having bonded to and at its periphery an annular, metallic reenforcing member 72 which rests against the peripheral surface of wall 66 of spider 34 and is held in place thereat by an annular shoulder formed on a plate 74.

Each of the plates 74 is telescopically disposed with respect to the respective wall portion 66 of spider 34, holding firmly in place therebetween its respective reenforcing member 72, said plates being firmly and stationarily secured to the spider 34 by a plurality of bolts 76 which pass through spaced and aligned openings in plates 74 and spider 34. Internally formed in each plate 74 coaxially with respect to the respective piston 68 is a cylindrical bore 78 for reciprocation therein of said piston during braking action. The side of each plate 74 opposite the side in which the respective bore 78 is formed is provided with an integral, radially extending guide stem 80 which is coaxial with the respective piston 68 and said bore 78 and which extends into a bore 82 formed in the respective brake shoe unit, generally indicated at 84. Also, in each plate 74 there is formed a pair of radial bores 86, one on each side of the respective stem 80, in each of which bores there is slidably mounted a pin 88 having a head 90. The head ends 90 of each pair of pins 88 engage a pair of shoulder portions 92 on each shoe unit 84, whereas the opposite ends of each pair of pins 88 engage diametrically opposite portions of an inturned peripheral flange 94 formed on each piston 68.

Referring particularly to Fig. 2, each brake shoe unit 84 comprises a pair of interconnected and oppositely inclined arcuate brake shoes 96, the interconnections consisting of end web formations 98 and a central web formation, generally indicated at 100, there being, for purpose of illustration only, two of such units 84 per wheel. Each pair of units 84 is opposed against radial separation, such as is effected by actuation of pistons 68, by a pair of springs 102 the ends of which are hooked over substantially central portions of the end web formations 98. The central web formation 100 of each shoe unit 84 is provided with one of the aforementioned bores 82 in which the respective stem 80 of its plate 74 is positioned for centering and guiding said unit 84, and is also provided with two of the shoulders 92 for driving engagement therewith of the respective head ends 90 of pins 88. The face of each shoe 96 has secured thereto in any suitable manner a brake lining 104 of extra heavy thickness. During inoperation of the brake the springs 102 are adapted for keeping the shoes and their linings out of engagement with their respective braking surfaces 22 and 50.

It will be noted in Figs. 2 and 3 that the bore 82 formed in each of the central web formations 100 of the respective shoe unit 84 provides a clearance for the respective stem 80 formed on its plate 74 in an axial direction, whereas in Figs. 1 and 2 it will be seen that no clearance is provided in a circumferential direction. This means that each of the shoe units 84 is free to shift laterally in the direction of the wheel axis for self-alignment in the drum, but cannot move in a circumferential direction, the latter movement not being provided for because of it not being needed.

Spider 34 is formed with a pair of passageways 106 and 108, one end of passageway 106 being in communication with an off-center portion of one of the fluid pressure chambers 64, and one end of passageway 108 being in communication with an off-center portion of the other chamber 64. The opposite ends of passageways 106 and 108 intercommunicate chambers 64 exteriorly of spider 34 at points on one side of the axial centerline of pistons 68 and on either side of the axial centerline of the wheel by means of a tubular duct 110 the ends of which are sweated into or otherwise secured to said spider 34 at the outlets of the passageways 106 and 108, the portion of said duct 110 intermediate said ends being disposed externally of said spider 34. On the other side of the axial centerline of the pistons 68 there is formed in spider 34 another pair of passageways 112 and 114, passageway 112 being in communication with an off-center portion of the chamber 64 which is in communication with passageway 106, and passageway 114 being in communication with an off-center portion of the chamber 64 which is in communication with passageway 108.

Into the outlet of passageway 112 there is sweated or otherwise secured an end of a duct 116, the other end of duct 116 being sweated or otherwise secured into an end of a passageway 118 formed in a boss 120 of spider 34. A filler screw 122 (see Fig. 1) is adapted for closing the passageway 118 after the system has been filled with braking fluid of, preferably, the hygroscopic type.

The passageway 114 communicates its respective pressure chamber 64 with the exterior of spider 34 by providing an outlet therefrom through a boss formation 124 on the spider. The outlet of passageway 114 in boss 124 is closed by a plug 126, and it also branches into a bleeder opening 128 which is closed by the usual bleeder screw 130 and which is adapted for the usual bleeding function. The plug 126 is employed merely for closing off the end of passageway 114 after said passageway has been drilled or otherwise machined.

As will be seen in Fig. 4, a fitting 132, having an internal bore 134, is screwed into the supported end of spider 34, the free end of the fitting 132 being provided with the usual threading for connection thereat of the end of the usual fluid pressure line (not shown) of the braking system which comes from the pedal or other actuating means within the vehicle. The bore 134 of fitting 132 is in alignment with a bore 136 formed in the spider 34, bore 136 leading into passageway 114 at which juncture the fluid under pressure changes direction and enters the chamber 64, which is in communication with passageway 114, through the passageway 114.

It will be noted that each of the seals 70 is provided at its working surface with an annular, peripheral upraised portion 138 (see Fig. 1) and that the passageways 106 and 112 are in communication with one of these portions 138 while the passageways 108 and 114 are in communication with the other of said portions 138. The result is that, when the brake pedal (not shown) is protracted for increasing the fluid pressure in the brake system, the pressure is transmitted to each chamber 64 and piston 68 simultaneously, the passageways 134, 136, 114, chamber 64, passageway 108, duct 110, passageway 106, the other chamber 64, passageway 112, duct 116, and passageway 118 all forming the direct and continuous communication, in that order, between the pressure inlet in fitting 132 and the filler plug 122. This continuous communication is present during inoperation of the brakes, as well as during operation, because of the upraised portion 138 of each of the intercommunicated chambers 64. It should also be noted that, because of the external ducts 110 and 116, drilling and machining of the passageways for the fluid pressure transmission through the system have been reduced to a minimum and that, as a result, the practical weight of the spider 34 has been reduced to a minimum because, otherwise, spider 34 would require various boss formations or enlarged portions for accommodating the passageways formed by the ducts 110 and 116. It will also be noted that the bleeder 130 is located in a forward position in the spider 34 whereat it is conveniently accessible for bleeding the system of any air which has entered the system, or of any air which must be expelled from the system during the fluid filling event, such filling taking place at the outlet of boss 120 which is closed by the removable plug or screw 122.

As has already been stated, the shoe linings 104 which engage the braking surfaces 22 and 50 upon actuation of the pistons 68 are, in assembly, of extra thickness. In other words, when the vehicle is equipped with a set of new and unused brake assemblies of the above description, the linings 104 of said sets are extra thick so that a slight movement of pistons 68 will, through the pins 88, cause effective braking between said linings and braking surfaces. In order for the operator to continue to enjoy effective braking with this slight movement of the pedal as the linings 104 wear down, the brake structure is marketed or equipped with an extra set of pins 88, this extra set of pins being slightly longer than the original set. Therefore, when linings 104 wear to a point which necessitates an inconveniently long stroke of the pedal and an extra charge of braking fluid, which, incidentally, will occur while the linings are still comparatively thick and usable, the old pins 88 are replaced by the new and longer pins. These new pins, which are a slight matter of expense and assemblage, will enable the continued use of the brake mechanism with the advantages of slight pedal stroke without an added charge of fluid into the system and practically complete utility of the entire lining thickness for braking. It is readily apparent that the structure described is particularly adapted for heavy work, such as in land and air transport employment, wherein the brake linings wear down comparatively fast to a point where excessive pedal movement and fluid charge necessitate unusually often and expensive lining replacement while the linings so replaced are still of some good.

Although the invention has been described with some detail it is not intended that such description is to be definitive of the limits of the inventive idea. The right is reserved to make such changes in the details of construction and arrangement of parts as will come within the purview of the attached claims.

What I claim is:

1. In a hydrostatic brake, a pair of relatively movable braking members, said members having complementary engageable braking surfaces, a spider, a pair of relatively movable members supported by said spider, means slidably mounted in one of said latter pair of members and in driven engagement with the other of said latter pair of members, means for driving said last mentioned member, said first mentioned means being in driving engagement with one of said braking members for driving its braking surface into engagement with the braking surface of the other of said braking members, and a sliding connection between said first mentioned one member and said second mentioned one member.

2. In a hydrostatic brake, a pair of relatively movable braking members, said members having complementary engageable braking surfaces, a spider, a pair of relatively movable members supported by said spider, means slidably mounted in one of said latter pair of members and in driven engagement with the other of said latter pair of members, means for driving said last mentioned member, said first mentioned means being in driving engagement with one of said braking members for driving its braking surface into engagement with the braking surface of the other of said braking members and being readily replaceable by other means of similar character to compensate for the wear of one of said braking surfaces, and a sliding connection between said first mentioned one member and said second mentioned one member.

3. In a hydrostatic brake, a pair of relatively movable braking members, said members having complementary engageable braking surfaces, a spider, said spider being formed with a chamber, a pair of relatively movable members supported by said spider one within said chamber and the other therewithout, means slidably mounted in one of said latter pair of members and in driven engagement with a flanged portion on the other of said latter pair of members, means for expanding said chamber for driving said last mentioned member relatively to the member disposed without said chamber, said first mentioned means being in driving engagement with one of said braking members for driving its braking surface into engagement with the braking surface of the other of said braking members, and a sliding connection between said first mentioned other member and said one braking member.

4. In a hydrostatic brake, a pair of relatively movable braking members, said members having complementary engageable braking surfaces, a spider, said spider being formed with a chamber, a pair of relatively movable members supported by said spider one within said chamber and the other therewithout, means slidably mounted in one of said latter pair of members and in driven engagement with a flanged portion on the other of said latter pair of members, means for expanding said chamber for driving said last mentioned member relatively to the member disposed without said chamber, said first mentioned means being in driving engagement with one of said braking members for driving its braking surface into engagement with the braking surface of the other of said braking members and being readily replaceable by other means of similar character to compensate for the wear of one of said braking surfaces, and a sliding connection between said first mentioned other member and said one braking member.

5. In a hydrostatic brake, a pair of relatively movable braking members, said members having complementary engageable braking surfaces, a stationary spider provided with a chamber, a pair of relatively movable members supported by said spider one within and one without said chamber, a pair of spaced pins slidably mounted in one of said latter pair of members and in driven engagement with the other of said latter pair of members, and means for driving said last mentioned member, said pins being in driving engagement with one of said braking members for driving its braking surface into engagement with the braking surface of the other of said braking members.

6. In a hydrostatic brake, a pair of relatively movable braking members, said members having complementary engageable braking surfaces, a stationary spider provided with a chamber, a pair of relatively movable members supported by said spider one within and one without said chamber, a pair of spaced pins slidably mounted in one of said latter pair of members and in driven engagement with the other of said latter pair of members, and means for driving said last mentioned member, said pins being in driving engagement with one of said braking members for driving its braking surface into engagement with the braking surface of the other of said braking members and being readily replaceable by a pair of other pins of similar character but of greater length to compensate for the wear of one of said braking surfaces.

7. In a hydrostatic brake, a pair of relatively movable frusto-conical braking members, said members having complementary engageable braking surfaces, a spider having a chamber formed therein, a piston reciprocally mounted in said chamber, means disposed between and in driven and driving engagement, respectively, with said piston and one of said braking members, means for actuating said piston for driving said first means, and a member supported by said spider for simultaneously guiding said piston, said first means and said braking member during the actuation of said piston by said second means.

8. In a hydrostatic brake, a pair of relatively movable frusto-conical braking members, said members having complementary engageable braking surfaces, a spider having a chamber formed therein, a piston reciprocally mounted in said chamber, means disposed between and in driven and driving engagement, respectively, with said piston and one of said braking members, means for actuating said piston for driving said first means, and a member supported by said spider in axial alignment with said piston and having a guideway for said first means and a guide portion for said braking member for simultaneously guiding said piston, said first means and said braking member during the actuation of said piston by said second means.

9. In a hydrostatic brake, a pair of relatively movable frusto-conical braking members, said members having complementary engageable braking surfaces, one of said members having a bore, a spider having a chamber formed therein, a piston reciprocally mounted in said chamber, means disposed between and in driven and driving engagement, respectively, with said piston and said braking member, means for actuating said piston for driving said first means, and a member supported by said spider in axial alignment with said piston and having a guideway for said first means and a guide portion for and extending into said bore of said braking member for simultaneously guiding said piston, said first means and said braking member during the actuation of said piston by said second means.

10. In a hydrostatic brake, a pair of relatively movable frusto-conical braking members, said members having complementary engageable braking surfaces, one of said members having a bore, a spider having a chamber formed therein, a piston reciprocally mounted in said chamber, means disposed between and in driven and driving engagement, respectively, with said piston and said braking member, means for actuating said piston for driving said first means, and a member supported by said spider in axial alignment with said piston and having a guideway for said first means and a guide portion for and extending into said bore of said braking member for simultaneously guiding said piston, said first means and said braking member during the actuation of said piston by said second means, the axial width of said bore being greater than the axial width of said guide portion whereby said guided braking member is free to shift laterally in an axial direction relative to said other braking member for proper engagement therebetween of their respective braking surfaces.

11. In a hydrostatic brake, a rotatable brake drum having an annular braking surface, a stationary spider supported internally of said drum and centrally of said braking surface, said spider being formed with a plurality of spaced fluid pressure chambers, a reciprocating piston mounted in each of said chambers, brake shoes operated radially by said pistons for engaging said rotatable braking surface, and a series of fluid ducts having their ends secured to said spider adjacent said chambers and their intermediate portions external of said spider for simultaneously communicating said chambers with each other and with a source of pressure for simultaneously actuating each of said pistons.

CLAUDE SAUZEDDE.